(12) United States Patent
Bowers (10) Patent No.: US 7,658,262 B2
(45) Date of Patent: Feb. 9, 2010

(54) AXLE ASSEMBLY

(75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 282 days.

(21) Appl. No.: 11/972,362

(22) Filed: Jan. 10, 2008

(65) Prior Publication Data

US 2009/0178875 A1 Jul. 16, 2009

(51) Int. Cl.
*B60K 17/16* (2006.01)

(52) U.S. Cl. ............... 180/344; 180/346; 180/378; 180/349; 74/606 R; 74/607; 301/137

(58) Field of Classification Search ............ 74/606 R, 74/607; 180/359, 344, 346, 358, 378, 379, 180/380, 383, 385, 348, 349, 352; 301/137, 301/125, 124.1
See application file for complete search history.

(56) References Cited

U.S. PATENT DOCUMENTS

| | | | | |
|---|---|---|---|---|
| 863,604 A | * | 8/1907 | Herzog | 180/349 |
| 949,229 A | * | 2/1910 | Gruenfeldt | 384/205 |
| 1,254,488 A | * | 1/1918 | EKern et al. | 74/607 |
| 1,255,490 A | | 2/1918 | Vehstedt | |
| 1,297,148 A | * | 3/1919 | Gracey | 180/347 |
| 2,145,670 A | * | 1/1939 | Tjaarda | 180/360 |
| 3,726,154 A | | 4/1973 | Diessner | |
| 4,086,826 A | * | 5/1978 | VON Kaler | 475/247 |
| 4,200,165 A | | 4/1980 | Bowman, Jr. et al. | |
| 4,388,842 A | | 6/1983 | Marcell | |
| 4,907,470 A | | 3/1990 | Kasemeier et al. | |
| 5,234,388 A | | 8/1993 | Nordkvist | |
| 5,644,955 A | * | 7/1997 | Yamamoto | 74/607 |
| 6,095,275 A | | 8/2000 | Shaw | |
| 6,257,090 B1 | * | 7/2001 | Arakawa et al. | 74/607 |
| 7,025,428 B2 | | 4/2006 | Gabella et al. | |
| 7,055,406 B1 | * | 6/2006 | Kuzuya et al. | 74/607 |
| 7,559,403 B2 | * | 7/2009 | Schmitz | 180/344 |
| 2003/0136613 A1 | | 7/2003 | Seki | |
| 2007/0199763 A1 | * | 8/2007 | Henze et al. | 180/378 |

* cited by examiner

*Primary Examiner*—Ruth Ilan
(74) *Attorney, Agent, or Firm*—Ulmer & Berne LLP (57) ABSTRACT

An axle assembly is provided that includes a differential housing, a first axle tube and a second axle tube. The first axle tube and the second axle tube are releasably secured to the differential housing and to one another.

21 Claims, 5 Drawing Sheets

AXLE ASSEMBLY

TECHNICAL FIELD

This application is related to axle assemblies for use in motor vehicles.

BACKGROUND

Rear axle assemblies are well known and commonly used in a variety of vehicles including automobiles, trucks, all terrain vehicles and small utility vehicles. The assemblies typically include a differential housing and two laterally extending axle tubes secured at one end to the differential housing. Each of the axle tubes can be adjacent to a wheel at an opposite end. The differential housing contains the final gear set in the drivetrain used to transfer torque from the vehicle engine to the rear wheels and also contains lubrication oil.

The axle tubes typically include one or more mount structures that can be used to secure various components of the vehicle suspension system. The load path for suspension loads is typically from one axle tube to the differential housing and then to the other axle tube. It is desirable to precisely maintain the position of the axle tubes relative to the differential housing to maintain the position of the suspension system mounting locations on the axle tubes.

Various methods are known to prevent relative movement, such as relative rotation, between the axle tubes and the differential housing. The differential housing is typically made of cast iron or a stamped sheet metal fabrication. When made of cast iron, each axle tube can be press fit into a bore in the differential housing, with the press fit preventing relative movement between the axle tubes and the differential housing.

Other known methods of maintaining the position of the axle tubes relative to the differential housing include the use of lock pins disposed at a right angle to the axis of the respective axle tube and engaged with the axle tube and the differential housing. Plug welds can also be used to fix the axle tubes relative to the differential housing. In this case, if the differential housing is made of cast iron, the plug weld may not be intended to fuse the axle tubes to the differential housing since welding cast iron can be problematic. Instead, the plug welds can be located on the axle tubes and extend into a mating aperture in the differential housing.

Known axle assemblies also include fabricated assemblies where the axle tubes and differential housing are made out of substantially the same material and are welded together forming one large unit. Known all terrain vehicles and small utility vehicles can include a differential housing made of cast aluminum and steel axle tubes. Each axle tube can include a flange that allows the axle tube to be bolted to the differential housing.

While the various methods described previously have been advantageously utilized, they may not be suitable for certain applications depending upon considerations of the magnitude of expected suspension loads, material strengths and the costs associated with manufacturing and assembling the axle assembly.

SUMMARY

An axle assembly is provided and includes a differential housing, a first axle tube and second axle tube. The first axle tube and the second axle tube are releasably secured to the differential housing and to one another.

A vehicle is provided and includes a pair of wheels and a differential housing positioned between the pair of wheels. The vehicle further includes a first axle tube having a first end portion adjacent the differential housing and a second end portion adjacent to a first one of the wheels. The first axle tube is releasably secured to the differential housing. The vehicle also includes a second axle tube having a first end portion adjacent the differential housing and a second end portion adjacent to a second one of the wheels. The second axle tube is releasably secured to the differential housing and the first axle tube.

BRIEF DESCRIPTION OF THE DRAWINGS

Various features and advantages of the inventive concept will become better understood with regard to the following description, appended claims and accompanying drawings wherein:

DETAILED DESCRIPTION

Figure 1:
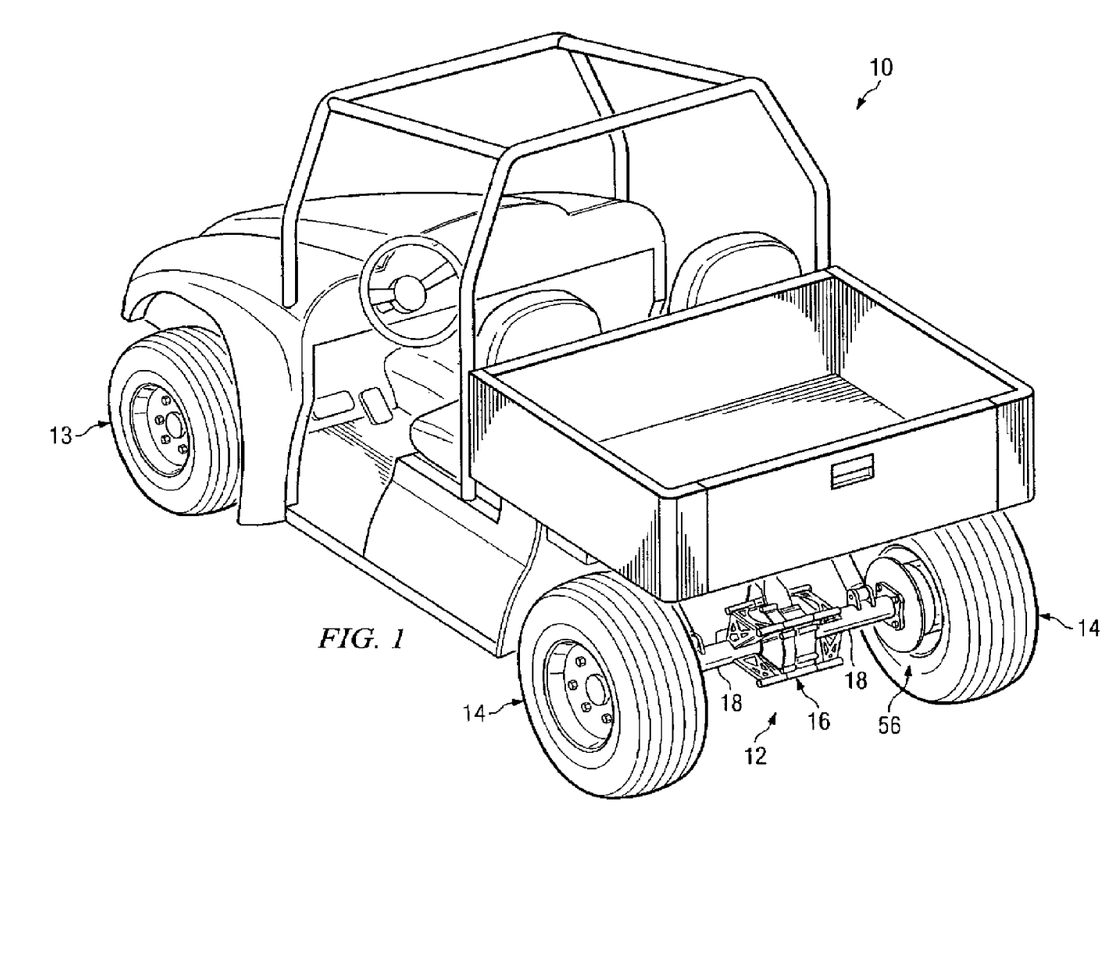
FIG. 1 is a left rear perspective view of a vehicle incorporating a rear axle assembly according to one embodiment.

FIG. 1 illustrates a vehicle 10 that can incorporate a rear axle assembly 12 according to one embodiment. The rear axle assembly 12 can be used on a small utility vehicle, such as vehicle 10 shown in FIG. 1 and can also be used on a variety of other vehicles including all terrain vehicles, automobiles and trucks.

Vehicle 10 includes two front wheels 13 (one shown) and two rear wheels 14. Vehicle 10 also includes a source of motive power (not shown) and a drivetrain, which includes the rear axle assembly 12, for transferring torque from the source of motive power to the rear wheels 14. The source of motive power can be an internal combustion engine, which can use one or more of a variety of fuels, an electric motor or any other suitable source of motive power.

Figure 2:
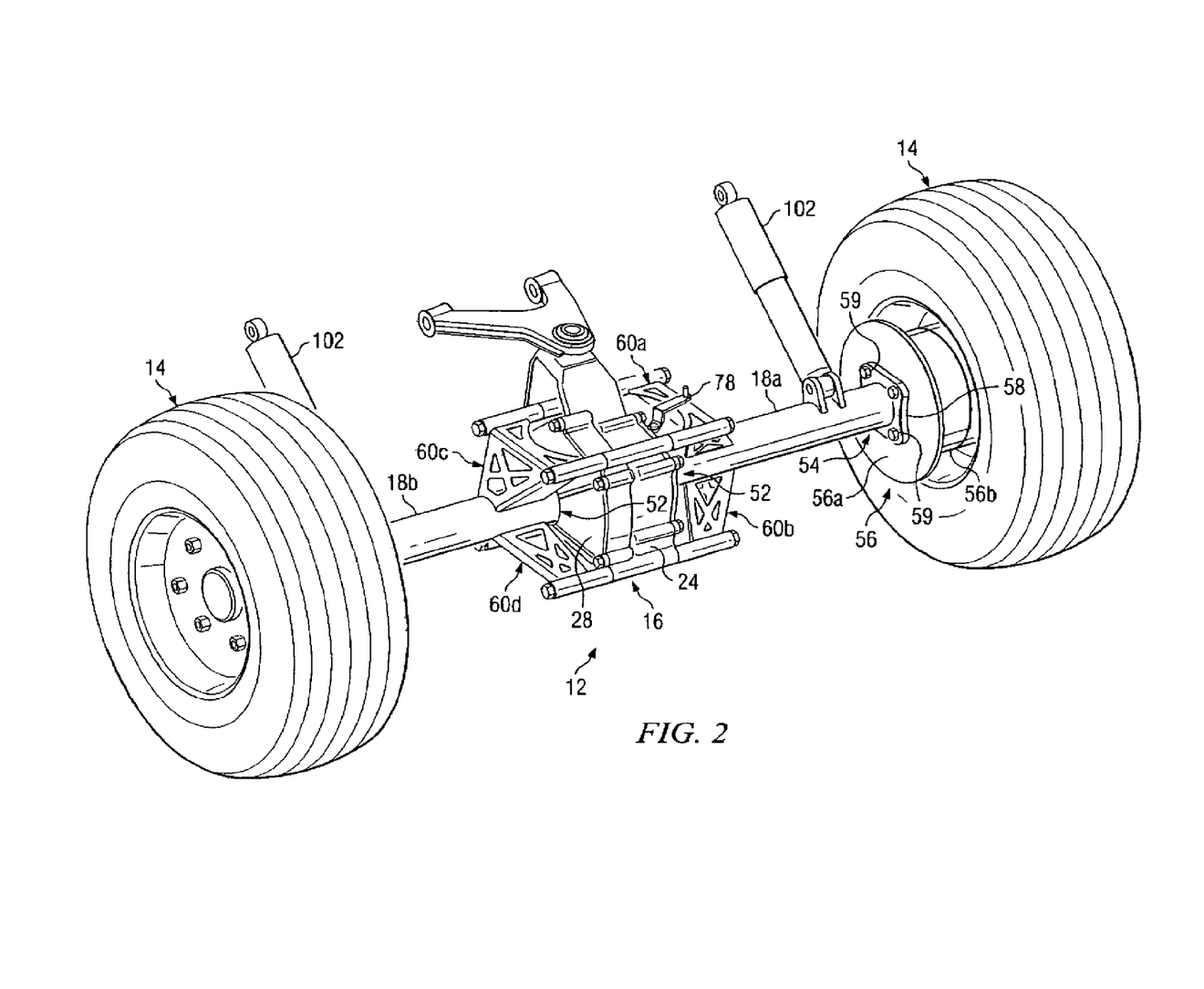
FIG. 2 is an enlarged perspective view of the rear axle assembly and the two rear wheels shown in FIG. 1.
Figure 3:
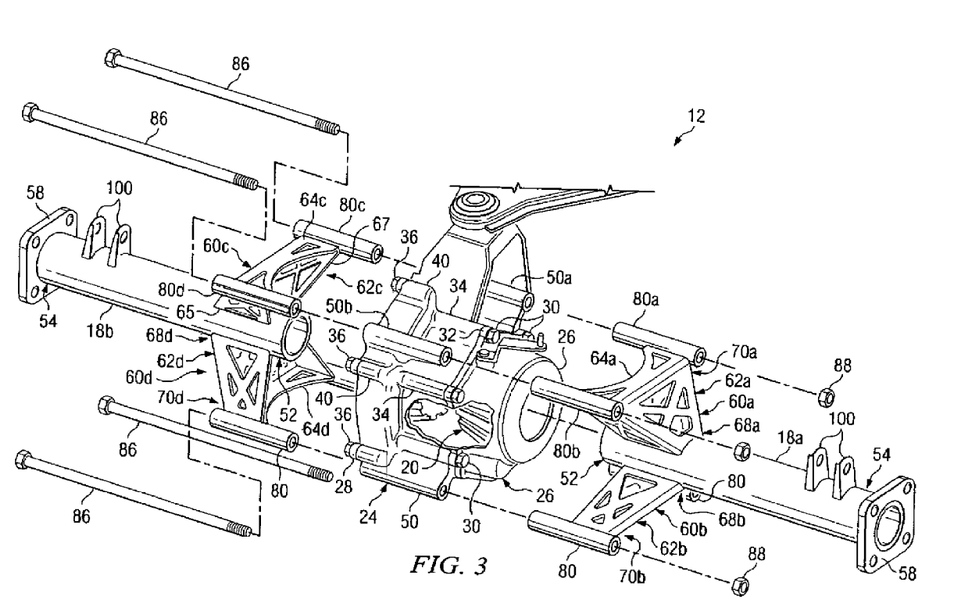
FIG. 3 is an enlarged, exploded perspective view of the rear axle assembly shown in FIGS. 1 and 2.

The rear axle assembly 12 can include a differential housing 16 and a pair of axle tubes 18, designated 18a, 18b in FIGS. 2 and 3. The axle tubes 18a, 18b are releasably secured to the differential housing 16 and are releasably secured to one another. A gear set 20 (FIG. 3) can be disposed within the differential housing 16 and can receive input torque from a driveshaft (not shown). Torque can then be selectively transferred, using the gear set 20 or differential gears, to the rear wheels 14 via rotatable axles (not shown) disposed within the axle tubes 18a, 18b.

The differential housing 16 can include a main body portion 24 and can also include one or more covers secured to the main body portion 24. For example, as shown in FIGS. 1-3, the differential housing 16 can include a right side cover 26 secured to one side of the main body portion 24 and a left side cover 28 secured to the opposite side of the main body portion 24. Cover 26 can be attached to the main body portion 24 using conventional fasteners, such as bolts 30. Each of the fasteners 30 can pass through an aperture (not shown) in a flange 32 of cover 26 into an internally threaded bore (not shown) of a right side mount boss 34 of the main body portion 24. As shown in FIG. 3, the main body portion 24 can include a plurality of the mount bosses 34 disposed about a perimeter of the main body portion 24.

Similarly, the left side cover 28 can be attached to the main body portion 24 using conventional fasteners, such as bolts 36. Each of the fasteners 36 can pass through an aperture (not shown) in the left side cover 28 into an internally threaded boss (not shown) of a left side mount boss 40 of the main body portion 24. As shown in FIG. 3, the main body portion 24 can include a plurality of the mount bosses 40 disposed about the perimeter of the main body portion 24. Conventional sealing members, such as O-rings and/or gaskets (not shown) can be used to seal the covers 26, 28 against the main body portion 24 to prevent lubrication oil within differential housing 16 from leaking externally of housing 16. The differential housing 16 can also include a plurality of mount ears 50 disposed about the perimeter of the main body portion 24 of housing 16, as shown in FIG. 3. Each mount ear 50 has a hollow interior that can receive a conventional fastener such as a bolt. The mount ears 50 are positioned outward of axle tubes 18a and 18b and can be used to releasably secure the axle tubes 18a, 18b to the differential housing 16 as subsequently described.

Each of the axle tubes 18 includes first 52 and second 54 end portions. The first end portion 52 of each axle tube 18 can be adjacent the differential housing 16 and can be positioned within the differential housing 16. For example, the first end portion 52 of axle tube 18a can extend through an opening in the right side cover 26 into differential housing 16 as shown in FIG. 3. Similarly, the first end portion 52 of axle tube 18b can be adjacent differential housing 16 and can extend through an opening in the left side cover 28 so that it is positioned within the differential housing 16 as shown in FIG. 2. The vehicle 10 can include a pair of brake assemblies 56 (one shown), with each of the brake assemblies 56 associated with one of the rear wheels 14 as shown in FIGS. 1 and 2 for the right rear wheel 14. It will be understood that each of the brake assemblies 56 can include a portion 56a that can be releasably secured to one of the axle tubes 18a, 18b and a portion 56b rotatably coupled with one of the rear wheels 14. Portions 56a and 56b are selectively rotatable with respect to one another, as is common in conventional disc brake, drum brake, and other brake configurations.

The second end portion 54 of each axle tube 18 can be adjacent to one of the rear wheels 14. For example, as shown in FIG. 3, the rear axle assembly 12 can include a pair of flanges 58 and each of the flanges 58 can be secured, for example by welding, to the second end portion 54 of one of the axle tubes 18. In one embodiment, each of the flanges 58 can include a bearing (not shown) for supporting an end of axle (not shown) disposed within one of the axle tubes 18a, 18b and rotatably coupled with a respective one of the rear wheels 14. In another embodiment, each of the flanges 58 can be releasably secured to portion 56a of one of the brake assemblies 56 using conventional fasteners, such as bolts 59 (as shown in FIG. 2 for axle tube 18a). As shown in FIGS. 1 and 2, the axle tube 18a can be adjacent to the right rear wheel 14 and the axle tube 18b can be adjacent to the left rear wheel 14.

The rear axle assembly 12 can include a plurality of brackets, with each of the brackets fixedly secured, for example by welding, to one of the axle tubes 18 and releasably secured to the differential housing 16. For example, axle assembly 12 can include brackets 60a, 60b, 60c and 60d, with brackets 60a and 60b being fixedly secured to axle tube 18a and brackets 60c and 60d being fixedly secured to axle tube 18b. However, it may be appreciated that other numbers of brackets, as well brackets having configurations different than the illustrated configurations of brackets 60a, 60b, 60c and 60d, can be used to releasably secure each axle tube 18 to the differential housing 16. As subsequently described and as shown in FIG. 3, the brackets 60a and 60b that are fixedly secured to axle tube 18a are also releasably secured to brackets 60c and 60d, respectively, that are fixedly secured to the axle tube 18b.

Each of the brackets 60a, 60b, 60c and 60d can include a web 62a, 62b, 62c, 62d, respectively. Each of the brackets 60a, 60b, 60c and 60d can also have a flange (none shown for bracket 60b). For example, brackets 60a, 60c and 60d can have flanges 64a, 64c and 64d, respectively, which can be integrally formed with the respective web 62a, 62c and 62d, as a sheet metal stamping. One or more of the brackets 60a, 60b, 60c and 60d can have the same shape and size, or each of the brackets 60a, 60b, 60c and 60d can have different shapes and/or sizes. The brackets 60a, 60b, 60c and 60d can be shaped and sized to accommodate the configuration of the particular differential housing to which they are releasably secured, for example differential housing 16.

Figure 4:
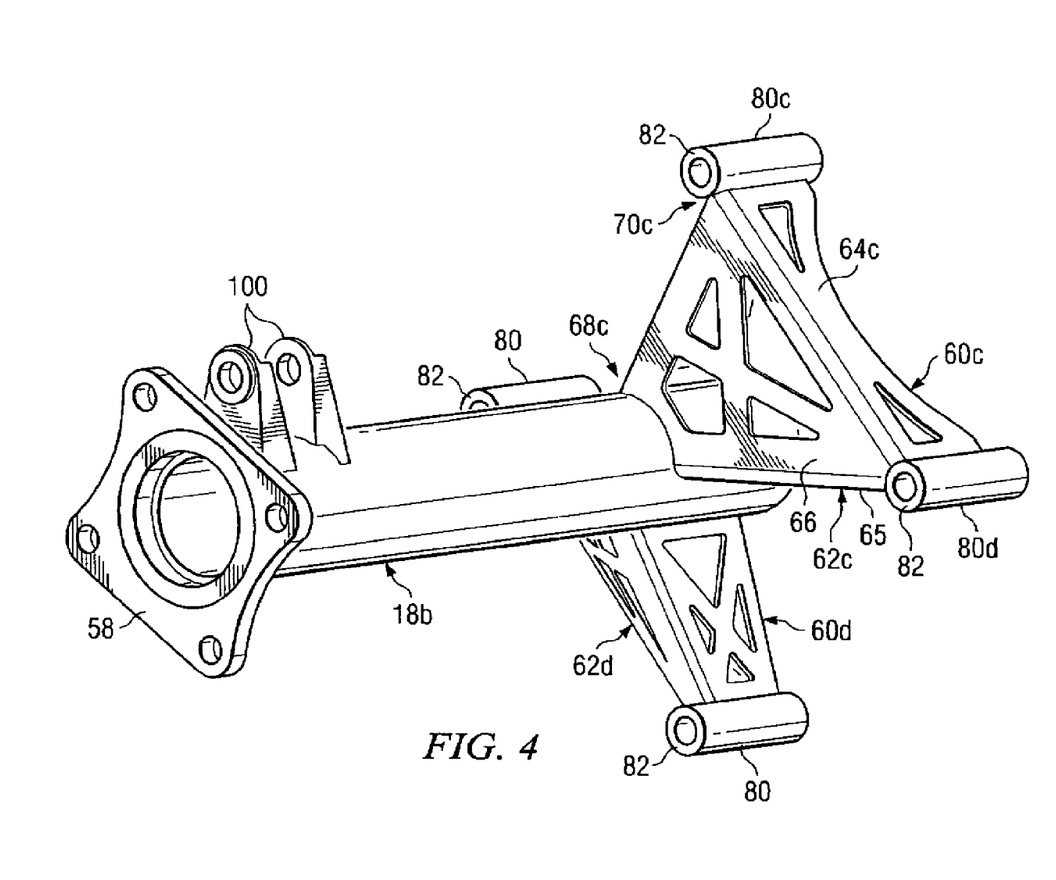
FIG. 4 is a perspective view of one of the axle tubes shown in FIGS. 1-3.
Figure 5:
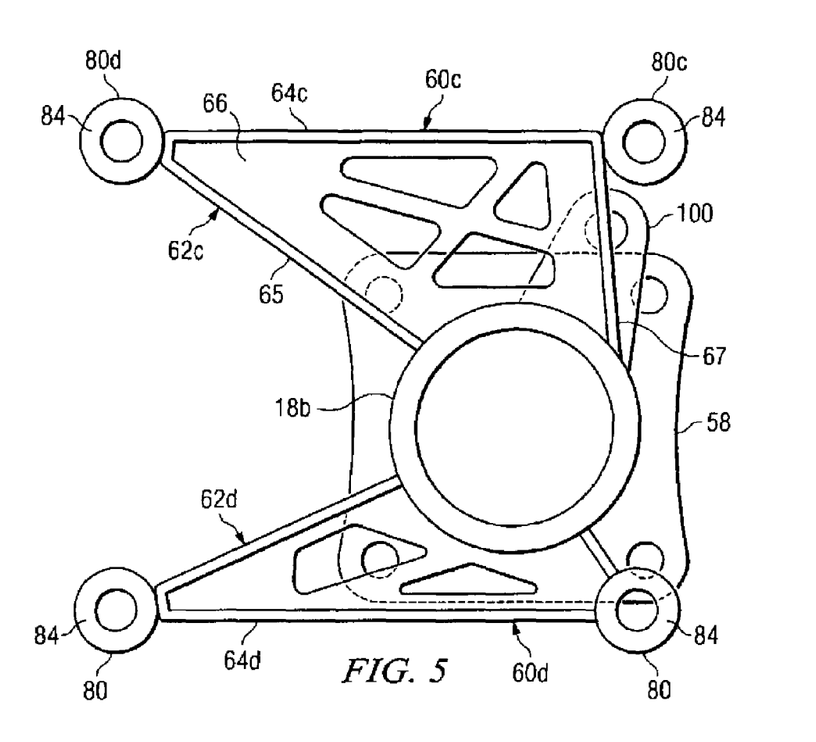
FIG. 5 is an end elevation view of the axle tube shown in FIG. 4.

Webs 62a, 62b, 62c and 62d and/or flanges 64a, 64c and 64d can have one or more apertures, as shown in FIGS. 2-5, for purposes of weight reduction. The weight reduction apertures can have virtually any shape. One or more of the webs 62a, 62b, 62c and 62d can include multiple members. For example, as shown in FIGS. 3-5 web 62c of bracket 60c can include members 65, 66 and 67. One or more of the members 65, 66, and 67 can extend generally radially outwardly from axle tube 18b. Members 65, 66 and 67 can have various shapes and sizes. Flanges 64a, 64c and 64d can extend laterally from webs 62a, 62c and 62d, respectively, toward the differential housing 16.

Webs 62a, 62b, 62c and 62d have inner portions 68a, 68b, 68c and 68d, respectively, that can be fixedly secured to the respective one of axle tubes 18a, 18b, for example by welding. Webs 62a, 62b, 62c and 62d also have outer portions 70a, 70b, 70c and 70d, respectively, that are outward of the respective axle tube 18a, 18b. A differential lock lever 78 can be mounted on the differential housing 16 and coupled to the gear set 20 (FIG. 3) inside of the differential housing 16. Bracket 60a can be configured to avoid interference with the operation of the differential lock lever 78.

Each of the brackets 60a, 60b, 60c and 60d can include one or more collars 80 that are positioned outward of the respective one of the axle tubes 18a, 18b. As shown in FIG. 3, each of the brackets 60a, 60b, 60c and 60d can include two of the collars 80. Each collar 80 can have a generally cylindrical shape with the hollow interior of each collar 80 being suitable for receiving a conventional fastener, such as a bolt. Each collar 80 can be sized, for example with respect to length and inside and outside diameters, as required to interface with the mating parts of differential housing 16, which are mount ears 50 in the embodiment illustrated FIGS. 1-3. It may be appreciated that collars can be used having other shapes provided that the collars have a hollow interior configured to receive a conventional fastener such as a bolt.

The collars 80 can be made using various manufacturing processes. For example, each collar 80 can be made from a heavy wall tube or can be machined from bar stock. The collars 80 can be fixedly secured, for example by welding, to brackets 60a, 60b, 60c and 60d. As shown in FIG. 3, collars 80 can be welded to a flange, for example flanges 64a, 64c and 64d, or to a web, for example webs 62a, 62b, 62c and 62d, or to both a flange and a web.

Opposite end surfaces 82, 84 (shown in FIGS. 4 and 5 for collars 80c and 80d) of each collar 80 can be machined before or after securing collar 80 to the respective bracket 60a, 60b, 60c and 60d to ensure that the end surfaces 82, 84 of collars 80 are "square", i.e., generally perpendicular to a centerline axis of the respective collar 80 to achieve the desired interface with mount ears 50 of differential housing 16 and with conventional fasteners such as bolts 86 and nuts 88. This can be desirable if any displacement or distortion of the collars 80 occurs during the manufacturing process, for example during welding processes that can be used to secure each web 62a, 62b, 62c, 62d to the respective one of the axle tubes 18a, 18b and to secure each collar 80 to the respective one of the brackets 60a, 60b, 60c and 60d. In another embodiment, sufficient fixturing can be used so that it is not necessary to do any post-welding machining of the end surfaces 82, 84 of the collars 80.

The brackets secured to a particular axle tube can be spaced apart from each other. For example, brackets 60a and 60b that are fixedly secured to axle tube 18a can be circumferentially spaced from one another. However, in another embodiment the brackets secured to a particular axle tube, for example the two brackets 60a, 60b secured to axle tube 18a, can be connected. As may be appreciated, their connection can be achieved in various ways. For example, one or more connecting members (not shown) can be secured to and interconnect the brackets 60a and 60b, or between each adjacent pair of brackets if more than two brackets are used.

Each of the brackets that is secured to axle tube 18a can be releasably secured to both the differential housing 16 and one of the brackets secured to axle tube 18b as shown in FIG. 3. As described previously, brackets 60a and 60b can be fixedly secured to axle tube 18a and brackets 60c and 60d can be fixedly secured to axle tube 18b as shown in FIG. 3. The collars 80 of brackets 60a, 60b, 60c and 60d and the mount ears 50 of differential housing 16, can be used to releasably secure bracket 60a to differential housing 16 and bracket 60c and to releasably secure bracket 60b to differential housing 16 and bracket 60d. This mounting configuration can be illustrated with reference to brackets 60a, differential housing 16 and bracket 60c shown in FIG. 3. Bracket 60a can include collar 80a that can be aligned with mount ear 50a of differential housing 16 and can also be aligned with collar 80c of bracket 60c as shown in FIG. 3C.

A conventional fastener such as bolt 86 can be inserted through collar 80c, mount ear 50a and collar 80a and secured using a conventional fastener, for example nut 88. Bracket 60a can also include a collar 80b that can be aligned with mount ear 50b of differential housing 16 and can also be aligned with a collar 80d of bracket 60c. Mount ears 50a and 50b are clamped between brackets 60a and 60c. Collars 80b, 80d and mount ear 50b can be releasably secured to one another using one of the bolts 86 and one of the nuts 88. Brackets 60b and 60d can be releasably secured to the differential housing 16 and to one another in the same manner as described for brackets 60a and 60c. Mount ears 50 are positioned outward of gear set 20 contained within differential housing 16 and accordingly bolts 86 do not interfere with gear set 20.

The axle assembly 12 can include a plurality of mount lugs 100, with each mount lug 100 being secured to one of the axle tubes 18. Each mount lug 100 can be configured for connection to a suspension system of vehicle 10. For example, each of the mount lugs 100 can be configured for connection to one of the shock absorbers 102 shown in FIGS. 1 and 2.

It may be appreciated that the axle assembly 12 can be subject to bending loads from the suspension system of vehicle 10, for example from the shock absorbers 102. The suspension load path is from one axle tube, for example axle tube 18a, through the collars 80 of brackets 60a and 60b, through the mount ears 50 of the main body portion 24 of differential housing 16 and to the axle tube 18b via the collars 80 of the brackets 60c and 60d secured to axle 18b. As a result of the configuration used to releasably secure the axle tubes 18 to the differential housing 16 as well as to one another, the right side cover 26 and the left side cover 28, as well as the substantial majority of the main body portion 24 of differential housing 16 are not in the suspension load path through the components of the axle assembly 12. Accordingly, covers 26 and 28, as well as the substantial portion of the main body portion 24 can be made of a thinner section of metal than would otherwise be required, which can result in weight and cost savings.

It may be appreciated that when the axle assembly 12 is subjected to a bending load from the vehicle suspension system, one or more of the bolts 86 that can extend through the collars 80 of the brackets 60a, 60b, 60c, and 60d and the mount ears 50 of differential housing 16, can be subjected to a tension load while one or more of the other ones of the bolts 86 can be subjected to a compression load. The bolts 86 can be made of a relatively high strength material to react tension loads acting on axle assembly 12 by the suspension system of vehicle 10. Compression loads acting on axle assembly 12 can be reacted by a reinforced area of the main body portion 24. For example, a compression load can be reacted by mount ears 50 of the main body portion 24, which can be reinforced relative to the remainder of the main body portion 24. The main body portion 24, covers 26 and 28 and axle tubes 18 can be made of aluminum or any other suitable metal or metal alloy.

While the inventive principles have been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. An axle assembly comprising:
   a differential housing;
   a first axle tube;
   a second axle tube, the first axle tube and the second axle tube being releasably secured to the differential housing and to one another;
   a first plurality of brackets, each of the first plurality of brackets being releasably secured to the differential housing and fixedly secured to the first axle tube; and
   a second plurality of brackets, each of the second plurality of brackets being releasably secured to the differential housing and fixedly secured to the second axle tube.

2. The axle assembly of claim 1, wherein:
   the first plurality of brackets are spaced apart from one another; and
   the second plurality of brackets are spaced apart from one another.

3. The axle assembly of claim 1, wherein:
   the differential housing comprises a plurality of mount ears positioned outward of the first and second axle tubes; and
   each of the mount ears is clamped between one of the first plurality of brackets and one of the second plurality of brackets.

4. The axle assembly of claim 3, wherein:
each of the first plurality of brackets and each of the second plurality of brackets comprises at least one collar spaced apart from the respective one of the first and second axle tubes; and
the axle assembly further comprises a plurality of fasteners, each of the fasteners extending through one of the collars of the first plurality of brackets, through an aligned one of the mount ears of the differential housing and through an aligned one of the collars of the second plurality of brackets.

5. The axle assembly of claim 3, wherein:
the differential housing is configured to contain a gear set of a vehicle; and
the mount ears of the differential housing are positioned outward of the gear set of the vehicle.

6. The axle assembly of claim 1, wherein:
each of the first plurality of brackets and each of the second plurality of brackets comprises a web having an inner portion fixedly secured to the respective one of the first and second axle tubes.

7. The axle assembly of claim 6, wherein:
at least one of the first plurality of brackets and at least one of the second plurality of brackets further comprises a flange integral with the web of the respective one of the first and second pluralities of brackets.

8. The axle assembly of claim 1, wherein:
each of the first and second axle tubes comprises a first end portion adjacent the differential housing and a second end portion laterally spaced from the differential housing; and
the second end portion is configured for association with a respective wheel of a vehicle.

9. The axle assembly of claim 8, further comprising:
a pair of flanges; wherein
each of the flanges is secured to the second end portion of one of the first and second axle tubes, each of the flanges being configured for attachment to a brake assembly of a vehicle.

10. The axle assembly of claim 1, further comprising:
a plurality of mount lugs, each of the mount lugs being secured to one of the first and second axle tubes, and
each of the mount lugs being configured for connection to a suspension system of a vehicle.

11. The axle assembly of claim 1, wherein:
the differential housing comprises a main body portion and at least one cover releasably secured to the main body portion; and
the first and second axle tubes are releasably secured to the main body portion of the differential housing.

12. An axle assembly comprising:
a differential housing;
a first axle tube;
a second axle tube, the first axle tube and the second axle tube being releasably secured to the differential housing and to one another;
a first bracket releasably secured to the differential housing and fixedly secured to the first axle tube; and
a second bracket releasably secured to the differential housing and fixedly secured to the second axle tube; wherein
the differential housing comprises a mount ear positioned outward of the first and second axle tubes; and
the mount ear is clamped between the first and second brackets.

13. A vehicle comprising:
a pair of wheels;
a differential housing positioned between the pair of wheels;
a first axle tube comprising a first end portion adjacent to the differential housing and a second end portion adjacent to a first one of the wheels, the first axle tube being releasably secured to the differential housing;
a second axle tube comprising a first end portion adjacent to the differential housing and a second end portion adjacent to a second one of the wheels, the second axle tube being releasably secured to the differential housing and releasably secured to the first axle tube;
a first bracket releasably secured to the differential housing and fixedly secured to the first axle tube; and
a second bracket releasably secured to the differential housing and fixedly secured to the second axle tube; wherein
the differential housing comprises a mount ear positioned outward of the first and second axle tubes; and
the mount ear is clamped between the first and second brackets.

14. The vehicle of claim 13, wherein:
the first end portion of at least one of the first and second axle tubes is positioned within the differential housing.

15. The vehicle of claim 13, further comprising:
at least one brake assembly comprising a first portion coupled to one of the wheels and a second portion releasably secured to one of the first and second axle tubes.

16. The vehicle of claim 13, wherein:
the pair of wheels is a pair of rear wheels.

17. A vehicle comprising:
a pair of wheels;
a differential housing positioned between the pair of wheels;
a first axle tube comprising a first end portion adjacent to the differential housing and a second end portion adjacent to a first one of the wheels, the first axle tube being releasably secured to the differential housing;
a second axle tube comprising a first end portion adjacent to the differential housing and a second end portion adjacent to a second one of the wheels, the second axle tube being releasably secured to the differential housing and releasably secured to the first axle tube;
a first plurality of brackets, each of the first plurality of brackets being releasably secured to the differential housing and fixedly secured to the first axle tube; and
a second plurality of brackets, each of the second plurality of brackets being releasably secured to the differential housing and fixedly secured to the second axle tube, each of the second plurality of brackets being releasably secured to one of the first plurality of brackets.

18. The vehicle of claim 17, wherein:
the differential housing comprises a plurality of mount ears positioned outward of the first and second axle tubes; and
each of the mount ears is clamped between one of the first plurality of brackets and one of the second plurality of brackets.

19. The vehicle of claim 18, wherein:
the first plurality of brackets are spaced apart from one another; and
the second plurality of brackets are spaced apart from one another.

20. The vehicle of claim 17, wherein:
each of the first plurality of brackets comprises at least one collar spaced outward of the first axle tube; and each of the second plurality of brackets comprises at least one collar spaced outward of the second axle tube.

21. The vehicle of claim 20, wherein:
the differential housing comprises a plurality of mount ears, each collar of each of the first plurality of brackets being aligned with one of the mount ears of the differential housing and one of the collars of one of the second plurality of brackets;
the vehicle further comprises a plurality of fasteners; and
each of the fasteners extends through one of the collars of one of the first plurality of brackets, the aligned one of the mount ears of the differential housing and the aligned one of the collars of one of the second plurality of brackets.

* * * * *